Dec. 22, 1970　　KEICHIRO HOZUMI　　3,549,262
APPARATUS FOR QUANTITATIVE ANALYSIS OF A PARTICULAR
CONSTITUENT OF A SAMPLE
Filed Dec. 28, 1966
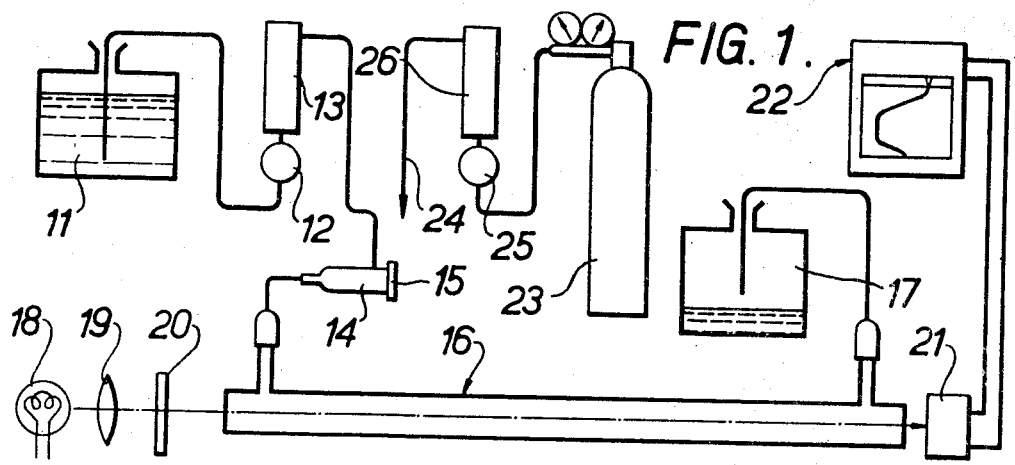
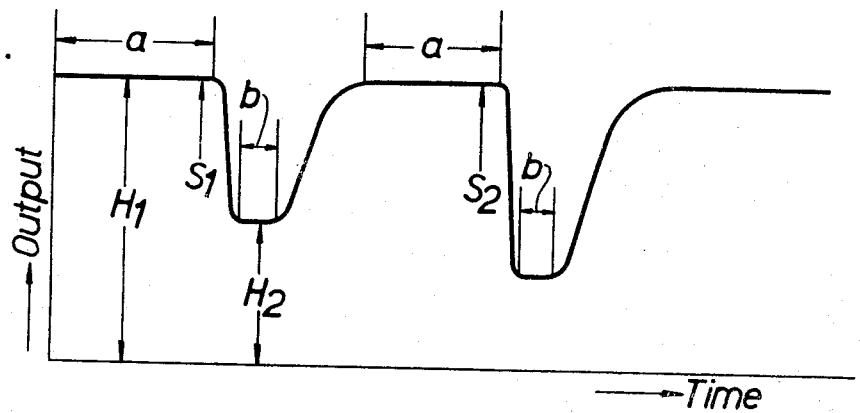
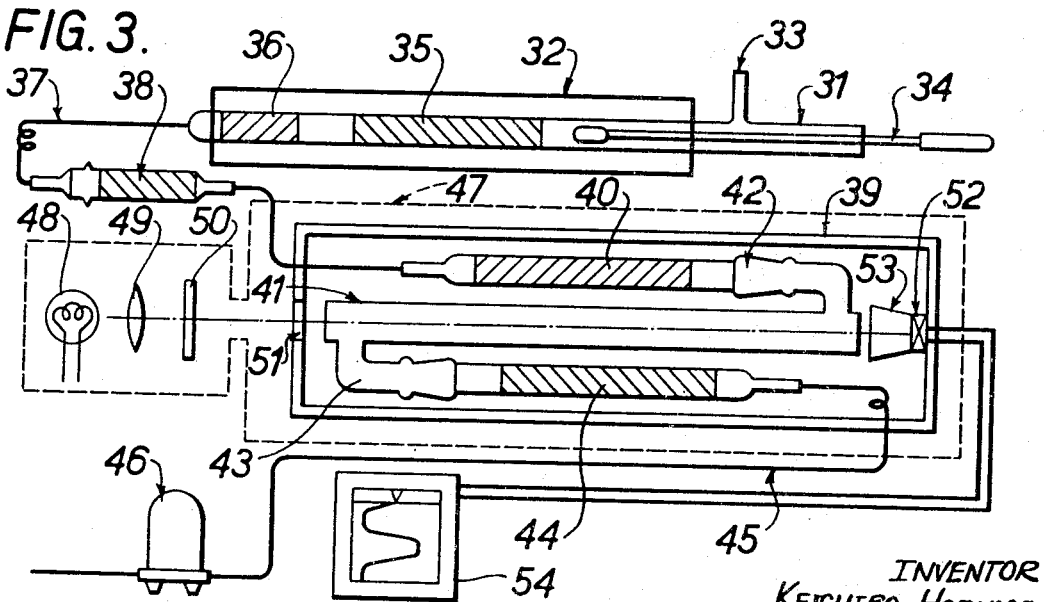
INVENTOR
KEICHIRO HOZUMI
BY
Morgan, Finnegan, Durham & Pine
ATTORNEYS

United States Patent Office 3,549,262
Patented Dec. 22, 1970

3,549,262
APPARATUS FOR QUANTITATIVE ANALYSIS OF A PARTICULAR CONSTITUENT OF A SAMPLE
Keichiro Hozumi, 53–19 Izumigawa-cho, Shimogamo, Sakyo-ku, Kyoto, Japan
Filed Dec. 28, 1966, Ser. No. 605,266
Claims priority, application Japan, Dec. 29, 1965, 41/81,261, 41/81,262
Int. Cl. G01j 3/46; G01n 21/12
U.S. Cl. 356—181                            1 Claim

ABSTRACT OF THE DISCLOSURE

An absorption photometry apparatus for quantitative analysis. An elongated light absorption cell having a large length dimension relative to the diameter thereof is arranged between a filtered light source and a photoelectric light receiving apparatus. Means are provided to have the carrier fluid and sample flow through the elongated light absorption cell at a fixed slow speed and linger in the light absorption cell to allow diffusion of the sample throughout the carrier fluid. The photoelectric light receiving apparatus senses the variance in the transmission of light at the wave length dictated by the filter to measure both the total amount of the specimen and the constituent concentration of the specimen.

---

This invention relates to apparatus for quantitative analysis of a particular constituent of a sample through the utilization of absorption photometry, and more particularly to apparatus for quantitative analysis by means of absorption photometry of oxygen in an organic substance.

It is known to measure the concentration of a particular constituent of a sample through the utilization of absorption photometry. According to a conventional method, first, a mixture of solution of the sample, as it is picked up or after being chemically reacted with a solvent, is prepared. A predetermined volume of the mixture solution is then measured off by a measuring flask. With the quantity of the particular constituent corresponding to the concentration of the mixture solution, a part of the solution is introduced into a light-absorbing cell in order to measure the concentration of the solution by means of absorption photometry. In the above conventional method, dilution of a sample with a solvent to a predetermined volume and sampling a portion of the diluted solution for introduction to a light-absorption cell are carried out in stepwise processes.

The primary object of the invention is to provide a new and useful apparatus for quantitative analysis of a particular constituent of a sample which saves the trouble of carrying out the dilution of a sample and the sampling of the diluted solution separately and by hand operation and which accomplishes absorption photometry corresponding to the measurement of the total amount of a particular constituent continusouly with astonishing rapidity with respect to a large number of samples.

Another object of the invention is to provide an improved apparatus for automatically recording an integral value of the concentration of a particular constituent in a sample, which is simple in construction, has little possibility of getting out of order, is applicable to any of solid, liquid and vapor samples, and allows separate quantitative analysis of mixed constituents and setting of sensitivity as desired. A further object of the invention is to provide a new and improved apparatus for quantitative analysis of oxygen in an organic substance in which the measuring and recording operations can be carried out with incomparably superior quickness and simplicity which have never been obtained hithertobefore.

The other objects and advantages of the invention will become apparent from the following detailed description in conjunction with the accompanying drawings in which:

FIG. 1 schematically illustrates the flow system of an embodiment of the invention;

FIG. 2 is a time versus light transmission diagram which is obtained with use of the apparatus illustrated in FIG. 1; and FIG. 3 schematically illustrates the flow system of the apparatus for quantitative analysis of oxygen in an organic substance, as a modified embodiment of the invention.

Referring to the drawing, especially to FIG. 1, the reference numeral 11 designates a solvent reservoir; 12, a flow control valve; 13, flow meter; and 14 designates a sample injector closed with a rubber cap 15. The numeral 16 designates an elongnated light-absorption cell having on the opposed ends thereof optically flat glass plates as the material of which Pyrex, transparent quartz or the like is selected in accordance with a required wave length. The reference numeral 17 designates a recovery vessel for solvent. The numeral 18 designates a source of light; 19, a condenser lens; and 20 designates an optical filter for obtaining a required wave length. The numeral 21 designates a light-receiver which, with the aid of a photocell or phototube, converts the intensity of the transmission light into an electrical signal which is in turn supplied to an electrical balancing recorder indicated at 22. In addition, said flow path for liquid may be replaced by a flow path 24 leading from a gas tank 23 to convey a gas therefrom to the sample injector 14 and the whole apparatus is thus modified to be adapted for gas or vapor flow system. The reference numerals 25 and 26 indicate a flow control valve and a flow meter, respectively, both inserted in the gas flow system.

To operate the present apparatus, a solvent or carrier gas is made to flow through the flow pattern at a fixed slow speed, the lamp 18 is switched on and the filter 20, which is suitably selected in accordance with the particular constituent, is placed in position. The output signal of the light-receiver is indicated on the recorder and the operator waits until this reference signal becomes stabilized. As for a solid sample, it is dissolved in a small amount of solvent (this solvent being either the same as the one used in the flow path or one which shows no absorption at least at the measured wave length) and, if necessary, a reaction reagent is added thereto, the total amount being taken in a syringe. As for a liquid sample, it is either taken in a microsyringe or handled in the same way as the solid. Gaseous sample can also be taken in a syringe or gas pipette. This is then inserted into the sample injector 14 through the cap 15 and the total amount is immediately, injected. .The sample soon flows into the light-absorption cell 16 and finally the total amount enters the light-absorption cell 16 and begins to move in the cell along with the solvent or carrier gas.

It is essential to the present measuring apparatus that the total amount of sample should linger in the light-absorption cell 16.

In case of the gas flow system involving a flow rate of 25 ml. per minute through the light absorption cell which has dimensions of 3 cm. in diameter and 40 cm. in length, for example, the duration in which the total amount of a certain kind of gas lingers in the light-absorption cell 16 is about 3 minutes considering the axial diffusion of the sample. Then the out-put signal which appears at the recorder varies after the injection of the sample $S_1$ or $S_2$ from the reference position which is optically 100% transmittance shown at $a$ in FIG. 2 to the response position at $b$, the curve being leveled over the region corresponding to the lingering duration of the sample. When the sample begins to flow out of the cell, the signal slowly moves back again to the reference position.

Supposing that the cell is a straight pipe with a uniform diameter and the diffusion within the cell is sufficiently effected in the rectangular section against the pipe axis, the light extinction $dI$, in a thin layer section with a thickness, $dx$, is proportional to the concentration of the constituent $c(x)$ in the section which is functional to the location within the cell. Thus, $$dI = -kIc(x)dx$$

where $k$ is the light absorption coefficient and $I$ is the intensity of incident light. Therefore, $$\frac{dI}{I} = -kc(x)dx$$

By integration over the entire region over which the constituent is distributed, the total light absorption through the cell can be calculated as follows:

$$\int \frac{dI}{I} = -k \int c(x)dx \quad (1)$$

On the other hand, the total constituent of the sample U existing in the cell is the summing up of the local amount of the constituent in the thin layer, $dx$, therefore, $$U = \int \pi r^2 c(x)dx = \pi r^2 \int c(x)dx \quad (2)$$

where $r$ is the inside radius of the cell.

From the Equations 1 and 2, it is indicated that the total light absorption is simply proportional to the total amount of the constituent as follows:

$$\int \frac{dI}{I} = -k \frac{U}{\pi r^2} \quad (3)$$

Suppose $I_o$ and $I_t$ as the intensities of incident light and the transmission light respectively, the Equation 3 may be converted to $$\int_{I_t}^{I_t} \frac{dI}{I} = \ln \frac{I_t}{I_o} = -k \frac{U}{\pi r^2}$$

here $I_t/I_o$ represents the light transmittance. Therefore, in FIG. 2, when the degree of light transmittance is found by measuring the height $H_1$ and $H_2$, instead of $I_o$ and $I_t$ respectively, the amount of the particular constituent of the injected sample can be evaluated.

As mentioned above, the analyser of the present invention based upon the principle involving an optical integration of a constituent concentration which is uniformly distributed within a long absorption cell is very simple in structure, has little possibility of getting out of order, is applicable to any of solid, liquid and gaseous samples, and allows selective quantitative analysis of mixed constituents and setting of sensitivity as desired by changing the cell diameter. Further, since the total amount is directly recorded on the recorder chart in terms of length, there is no need of performing troublesome area integration with respect to concentration-time which has been required with the conventional differential method.

FIG. 3 illustrates an application of the present invention to quantitative analysis of oxygen in an organic substance. Refering to FIG. 3, the numeral 31 designates a combustion tube; 32, an electric furnace for heating; 33, a side tube for introducing a carrier gas; 34, sample inserting spoon 35, carbon granules and 36 designates a packed layer of reduced copper. The tail end of the combustion tube 31 is connected to a sodium hydroxide-packed tube 38 through a metal capillary tube 37 and further communicates with an iodine pentoxide packed tube 40 in a thermostatic dark chamber 39. The iodine pentoxide packed tube 40 is fitted in a ground glass joint 42 situated at one end of an elongated, light-absorption cell 41, which has another ground glass joint 43 at the other end thereof in which is fitted a tube 44 packed with an iodine removing agent such as silver granules. The above mentioned flow path communicates through a capillary tube 45 with an air pump 46, where a suction of the carrier gas is effected. The thermostatic dark chamber 39 is retained in a casing 47 with a suitable head insulator interposed therebetween. A source of light is provided which consists of a lamp 48, a condenser lens 49 and a filter 50 and emits light which is passed through the window 51 of the thermostatic dark chamber 39 into the light-absorption cell 41. A light-receiver consists of a light-sensitive element 52, e.g. a silicone photocell 52 and a hood 53, the electrical output thereof being picked up by an electronic balancing recorder 54.

To operate the apparatus of the above mentioned structural arrangement according to the invention, an inert gas such as nitrogen or argon is fed as the carrier gas through the side tube 33 and is allowed to consistently overflow from the opening mouth of the combustion tube. The entry of the atmosphere is thus perfectly prevented. A part of the carrier gas fed through the side tube 33 is sucked into the system by adjusting the air pump 46, so that it flows successively through the combustion tube 31, sodium hydroxide-packed tube 38, iodine pentoxide-packed tube 40, light-absorption cell 41 and iodine removing agent-packed tube 44. To give an example, the supply of the carrier gas is 100 ml. per minute while the suction of the air pump is 25 ml. per minute. Under this condition, the intensity of the light transmission through the light-absorption cell 41 is recorded on the recorder 54.

Next, a sample is placed on the sample inserting spoon 34, and the latter is then inserted through the opening of the combustion tube 31 until the sample reaches a point just short of the side tube 33, where it is left for 15–20 seconds so that the air and moisture on the surface of the sample inserting spoon 34 are swept away. Thereafter, the inserting spoon is squickly pushed forward into the high temperature zone of the combustion furnace 32 as shown in the figure to allow the decomposition of the sample to take place. The decomposed gases come into contact with the carbon granules 35 to convert the oxygen in the sample all into carbon monoxide and, further, the decomposition of the carbonyl sulfide takes place on the reducer copper 36. At the sodium hydroxide-packed tube 38, the removal of the acidic gas is effected, while the neutral carbon monoxide passes here and is finally oxidized in the iodine pentoxide-packed tube 40. As the iodine liberated at this time has been heated at 120° C. or thereabouts by the thermostatic dark chamber 39, it is introduced in the vapor phase along with the carrier gas into the light-absorption cell 41. The length of this light-absorption cell is such that the total amount of the liberated iodine on the carrier gas can linger therein for 2–3 minutes while slowly traveling. For example, if the amount of flow of the carrier gas is 25 ml. per minute, the light-absorption cell is 3 cm. in inside diameter and 40 cm. in length. Since the minimum light absorption of iodine vapor is in the neighborhood of 530 m$\mu$, this must be taken into consideration in selecting the filter 50. When the iodine begins to flow into the light-absorption cell 41, the intensity of transmission light decreased, so that the corresponding decrease in the electrical output of the photocell 52 is recorded on the recorder 54. When the total amount of iodine has centered into the light-absorption cell 41, the intensity of light transmission becomes constant, so that the pen of the recorder 54 becomes temporarily stationary. The intensity of light transmission will again increase when the iodine proceeds in the light-absorption cell 41 until the vapor front of the iodine begins to come out from the side tube 43. And when all the iodine has been exhausted, the pen of the recorder 54 returns to the position which it assumed before the insertion of the sample. The movement of the pen recorder on the chart responds to the total amount of the iodine which has passed through the light-absorption cell 41 and therefore the iodine amount can be measured in a very simple way. In addition, the optical system in the present invention applies the principle of the optical integration of constituent concentration which has already been described before with reference to FIG. 1. The iodine exhausted from the light-absorption cell 41 is absorbed and removed within the packed tube 44 having silver or sodium hydroxide granules therein.

As mentioned above, according to the present invention after the oxygen in an organic substance is converted into carbon monoxide it is reacted with iodine pentoxide and the iodine which forms at this time is introduced into a long, light-absorption cell, the light absorption caused by the total amount of iodine being recorded on a recorder through a photocell, so that the oxygen content of the sample can readily be calculated from the movement of the pen on the recorder chart. Thus, the system according to the invention is incomparably superior in quickness and simplicity to the conventional methods according to which carbon monoxide is converted into carbon dioxide or iodine which is then absorbed by an absorption tube and the weight increase of the absorption tube is measured by means of a chemical balance.

What I claim is:

1. In an optical constituent concentrated integrator for analyzing samples having an optical path; a light source at one end of the optical path; means to filter all the light from the light source except the light at a selected wave length; photoelectric light receiving means at the opposite end of said optical path adapted to convert light into electrical signals; a light-absorption flow cell arranged in said optical path and extending in its direction between said light source and said photoelectric light receiving means, said light-absorption cell having an inlet and an outlet substantially at the respective opposite ends thereof; means for introducing carrier fluid into the light-absorption cell through the inlet thereof; means for injecting the sample to be analyzed into the flow of the carrier fluid at a position immediately before the inlet of the light-absorption cell; means for indicating and recording the electrical signals produced at said photoelectric light receiving means as a function of the total amount of sample being analyzed and the transmittance of light of said selected wave length through the sample, the improvement comprising said light-absorption flow cell being elongated and having an extremely large length compared to the width thereof such that the sample being analyzed lingers in the elongated light-absorption flow cell to totally diffuse in the carrier fluid while in the elongated light-absorption flow cell and means to regulate the flow of carrier fluid and sample through the elongated light-absorption flow cell such that the carrier fluid and sample can flow through the elongated light-absorption flow cell at a fixed slow speed.

References Cited

UNITED STATES PATENTS

| | | | |
|---|---|---|---|
| 3,236,148 | 2/1966 | Pelavin | 356—181 |
| 3,236,602 | 2/1966 | Isreeli | 356—246X |
| 3,240,109 | 3/1966 | Grant, Jr. | 356—207X |
| 3,307,447 | 3/1967 | Carleton et al. | 356—246 |
| 3,319,512 | 5/1967 | Isreeli | 356—181 |
| 3,345,910 | 10/1967 | Rosin et al. | 356—181 |
| 3,418,053 | 12/1968 | Pelavin | 356—246X |

RONALD L. WIBERT, Primary Examiner

W. A. SKLAR, Assistant Examiner

U.S. Cl. X.R.

250—218; 356—207, 208, 246